No. 747,784. PATENTED DEC. 22, 1903.
Y. SHANNON.
PHOTOGRAPHIC APPARATUS.
APPLICATION FILED APR. 21, 1903.
NO MODEL.
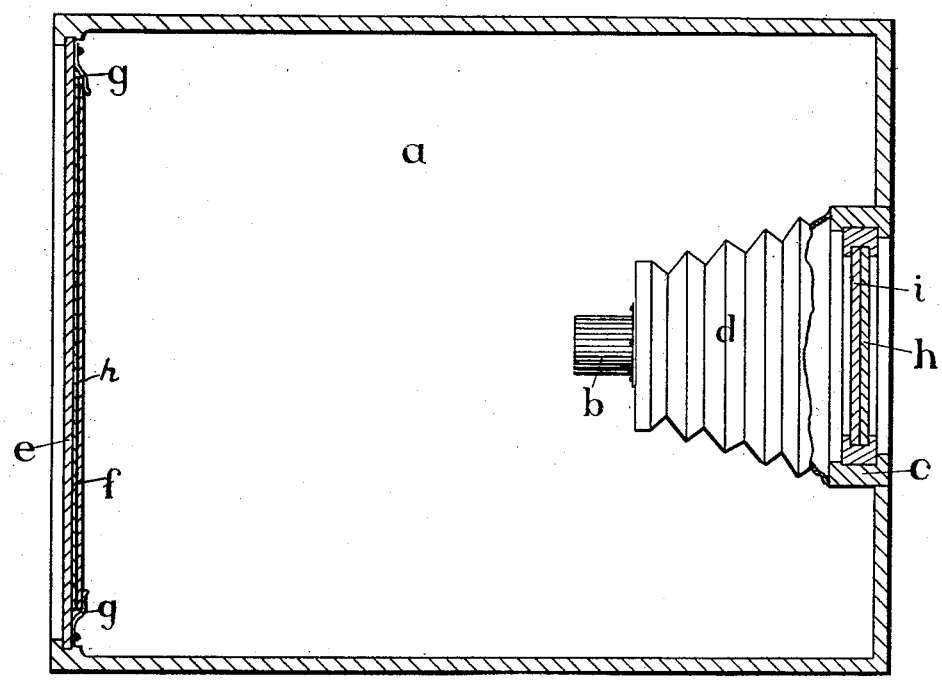
WITNESSES
May F. Ritchie
Frank S. Devire
INVENTOR
Young Shannon,
BY HIS ATTORNEY
Frank H. Allen No. 747,784. Patented December 22, 1903.

UNITED STATES PATENT OFFICE.

YOUNG SHANNON, OF NORWICH, CONNECTICUT.

PHOTOGRAPHIC APPARATUS.

SPECIFICATION forming part of Letters Patent No. 747,784, dated December 22, 1903.

Application filed April 21, 1903. Serial No. 153,694. (No model.)

*To all whom it may concern:*

Be it known that I, YOUNG SHANNON, a citizen of the United States, residing at Norwich, in the county of New London and State of Connecticut, have invented a new and useful Improvement in Photographic Apparatus, of which the following is a specification.

This invention relates to photographic apparatus, and particularly to enlarging-cameras, my immediate purpose being to so improve such apparatus that a peculiarly soft and pleasing effect will appear in the enlarged print or negative, all defects and all lines incident to retouching being eliminated or modified instead of being magnified, as is now common in all the enlarging apparatus and processes known to me. My said apparatus has the further advantage of improving the modeling of the image in portraiture.

The drawing annexed hereto is a sectional view of a dark chamber (camera obscura) shown in central vertical section and having mounted therein a suitable lens and negative holder.

The dark chamber proper is indicated by the reference-letter $a$.

$b$ denotes the lens, and $c$ the negative-holding frame. The lens $b$ is shown as mounted in the free portion of a bellows $d$ in order that the lens may be adjusted with respect to the negative.

$e$ denotes a removable backboard, to the inner face of which a sheet of sensitized paper or other suitable material $f$ is fastened by means of spring-clips $g$.

The several parts of my apparatus and the general arrangement of the same as thus far described are substantially the same as in enlarging-cameras as now most commonly constructed.

Assuming that we have a camera of the class shown and described and that it is desired to make an enlargement from an ordinary negative, the said negative (here indicated by the letter $h$) is placed in the frame $c$, and I also place between the said negative and the lens $b$ a sheet of ground glass, celluloid, or the like translucent material $i$, and I preferably place the said ground glass in contact with the negative. The lens is then focused to project an image of the desired size on the board $e$ or upon a sheet of sensitized paper mounted thereon, and the light is then allowed to enter the camera through the negative, ground glass, and lens, resulting in transferring an enlargement of the desired image to the sensitized sheet.

The ground-glass curtain $i$, which I have referred to and which forms the essential feature of my present invention, operates in practice to filter the rays of light and eliminate the marks of retouching, as well as all stipple-marks and ordinary defects in the negative, and thus provides a smooth field upon which the lines of the image appear clearly defined but with a pleasing softness and improved modeling.

In some instances—for example, when it is desirable to further subdue the rays of light—I provide a second screen, $k$, of like material as the screen $i$, and I preferably locate said second screen adjacent to or in contact with the sensitized paper, as seen in the drawing.

When enlarging from particularly dense negatives, I find it desirable to flow or otherwise coat the screen or screens with oil or benzene, which I find in practice hastens the printing operation without in any degree detracting from the filtering effect of the screen. It will be obvious that instead of the sensitized sheet of paper, as is here shown, a sensitized plate could be substituted therefor, which when properly developed and fixed would provide an enlarged negative from which contact-prints could be made that would be free from all defects.

The cost of the interposed transparent screen is practically nothing, but the desirable results attained by the use of my improvement are almost inestimable.

Having thus described my invention, I claim—

1. In combination, in an enlarging-camera of the class referred to, a lens, a plate-holder, and a translucent mat-surface screen interposed between said lens and plate-holder.

2. In an enlarging-camera, in combination, a dark chamber, oppositely-disposed plate-holders in said chamber, a lens intermediate said plate-holders, and a translucent mat-surface screen located between the lens and one of said plate-holders.

In testimony whereof I have signed my name to this specification in the presence of two subscribing witnesses.

YOUNG SHANNON.

Witnesses:
 FRANK H. ALLEN,
 MARTHA SHANNON.